United States Patent [19]

Ellis

[11] 4,050,417
[45] Sept. 27, 1977

[54] CAT AND DOG COMBINATION STRETCHER AND SCRATCHER

[76] Inventor: Robert P. Ellis, 350 Lomas Santa Fe Drive, Solana Beach, Calif. 92075

[21] Appl. No.: 700,761

[22] Filed: June 29, 1976

[51] Int. Cl.² .............................................. A01K 29/00
[52] U.S. Cl. ....................................... 119/156; 119/1
[58] Field of Search .............. 119/156, 157, 159, 160, 119/1, 29, 106

[56] References Cited

U.S. PATENT DOCUMENTS

| | | | |
|---|---|---|---|
| 2,140,677 | 12/1938 | Holmes | 119/157 |
| 2,282,672 | 5/1942 | Nelson | 119/156 X |
| 2,688,311 | 9/1954 | Pierce | 119/156 |
| 3,799,118 | 3/1974 | Sandefur | 119/106 |

Primary Examiner—Jay N. Eskovitz

[57] ABSTRACT

A cat and dog combination stretcher and scratcher in which, instead of the customary manner of hanging a medicated collar around the neck of the animal to chase away the fleas and similar insects, I provide a medicated pad adapted to lie on the floor over which the cat and dog like to stretch on the smooth side and scratch on the opposite rough side, the latter side emanating the fumes and vapor of an insecticide which adhere to their furs and thus repel annoying insects from their bodies. The opposite side of the pad is used for them to stretch, it being very smooth and being adapted to turn the pad upside down occasionally to give the animals a preference for either stretching on the smooth and slippery side or scratching on the rougher side which causes the insecticide to be emited through small holes therein.

1 Claim, 2 Drawing Figures

U.S. Patent  Sept. 27, 1977  4,050,417

CAT AND DOG COMBINATION STRETCHER AND SCRATCHER

BACKGROUND OF THE INVENTION

Heretofore the only practical means for keeping annoying insects away from cats and dogs was to hang a collar, impregnated with insecticide, around their necks. Such means are very annoying to the animals, especially dogs, whose capacity for smelling is superfine and to have such a collar hanging under his nose is considered a crime by many persons and which cause many dogs to run away from home. Besides, the distance of the collar from such places between the toes of the dog, the upper end of the tail, etc., cannot be reached from the neck and are inefficient. Also, the time length of the collar is only a maximum of three months whereas the length of use of my stretch and scratch pad can easily endure three years. With the use of my insecticide pad, the animal themselves apply the cure to their satisfaction while also enjoying themselves. The smooth side is used as a stretcherwhile the opposite rough side is used as a scratcher which simultaneously exits the healing medicament onto their bodies. Both the cat and dog will easily and quickly adapt themselves to use this pad which the owner may turn upside down on the floor occasionally to serve both methods of desire.

BRIEF DESCRITPION OF THE INVENTION

Figure 1:
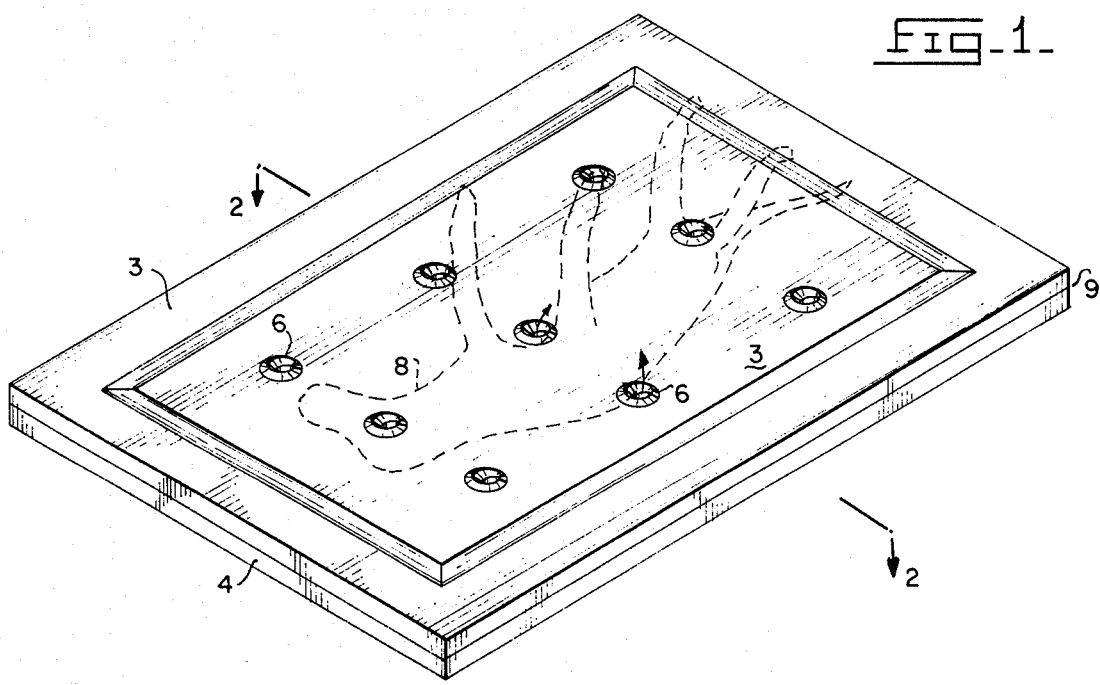

FIG. 1 in the drawing is an isometric view of the scratch side of the pad.

Figure 2:
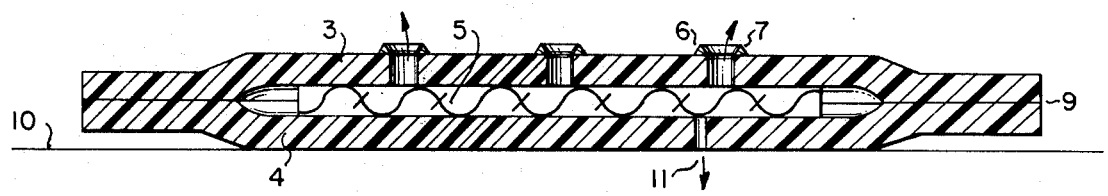

FIG. 2 is a cross section of FIG. 1 on the line 2-2 thereof.

This device is of very simple construction being composed of two similar sheets of material, preferably plastic and flexible with very smooth outer surfaces on numerals 3 and 4, the completed pad being adapted to lay on the floor of a room or other desired place with either side facing upwards. When sheet 4 with its smooth and slippery side is facing upwards, the animals, especially cats, enjoy themselves by stretching their limbs and bodies, while should the roughened sheet 3 face upwards, the dog likes to scratch itself on the roughened surface and while doing so, his movements and weight will cause some of the impregnated insecticide in the cloth 5, to exude out of the small holes 6 and naturally adhere to his fur to kill the obnoxious insects therein, and gradually cover all parts of his body. The holes 6 are made through sheet 3 and may be of any desired configuration and preferably with the edges 7 of the holes upstanding above the surface of the sheet 3 to roughen the surface thereof to suit the dog's desire, and to better the feeling of the dog. By punching the holes 6 through the inner side of the sheet 3, preferably with the tip of an ordinary nail, a suitable hole may be made without punching out any part of the sheet material, yet providing a projection with a hole. Any other means may also be used.

By impregnating the cloth sheet 5 with a greasy substance, it will last a long time. The configuration of the sheets may also be of many kinds such as the configuration of a dog or cat or any other device. To inclose the impregnated cloth 5 between the two sheets 3 and 4 for perpetual use, the edges of the sheets 3 and 4 are sealed together by thermo-pressing means, thus creating an everlasting medical enclosure, free from children or people who may be curious. This joint is indicated by 9 in the drawing, and the dog by the dotted lines 8. The sheets 3 and 4 are also impervious to moisture so as to keep the outer surfaces clean and dry, and extend the life of the pad. The hole 11 is shown only in case the owner desires to do so.

I claim:

1. A combination cat and dog stretcher and scratcher pad comprising two sheets of smooth flexible material of equal size and configuration with their edges securely bonded together to form a closed container, an inner flexible element impregnated with insecticide and encapulate within the two bonded sheets, said two sheets including holes therein which extend entirely therethrough for establishing a passageway between said inner flexible element and the exterior of said sheets, roughened projections extending outwardly from one sheet at each hole therein whereby said one sheet with said roughened projections may be used by an animal as a scratching pad with the weight of the animal causing insecticide vapors to be emitted through passageways onto said animals or the other smooth side may be used by an animal as a stretching pad with the weight of the animal causing insecticide to be emitted through passageways onto said animals.

* * * * *